July 2, 1968  R. WOODELL  3,390,704
POLYOLEFIN FLUID CONDUIT LAMINATES
Filed Nov. 19, 1964
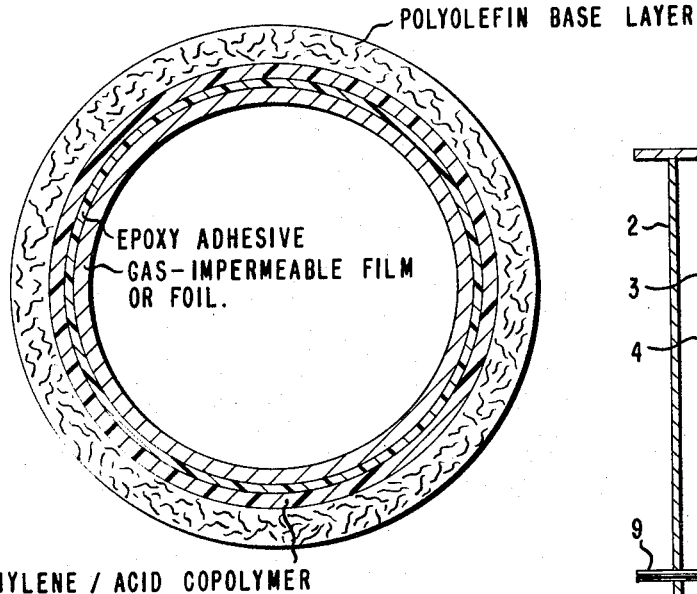
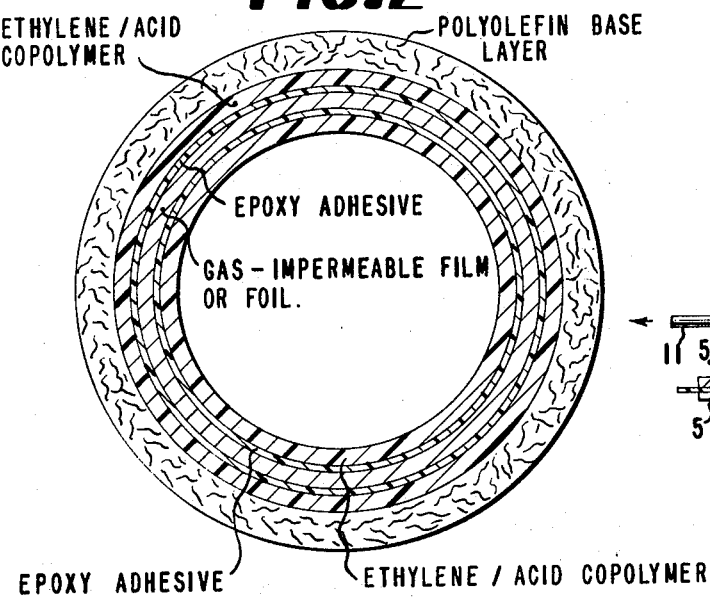
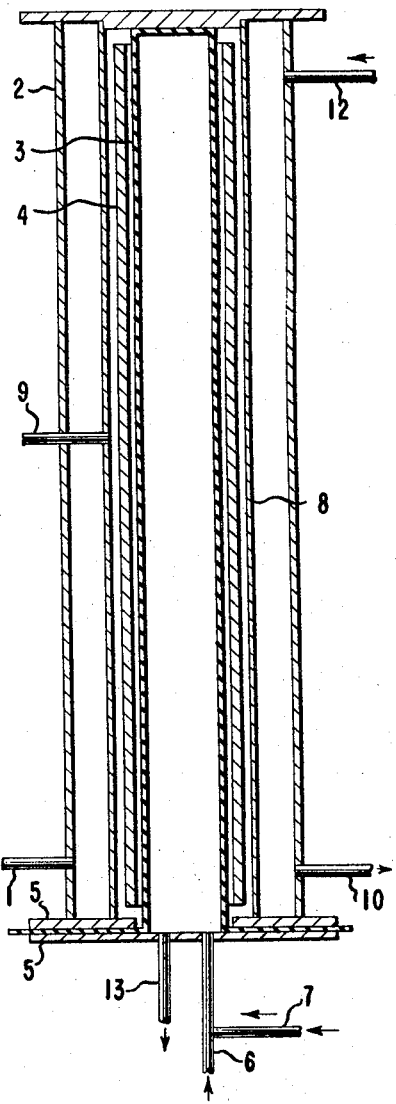
INVENTOR
RUDOLPH WOODELL
BY
ATTORNEY

United States Patent Office 3,390,704
Patented July 2, 1968

3,390,704
POLYOLEFIN FLUID CONDUIT LAMINATES
Rudolph Woodell, Richmond, Va., assignor to E. I. du Pont de Nemours and Company, Wilmington, Del., a corporation of Delaware
Filed Nov. 19, 1964, Ser. No. 412,459
14 Claims. (Cl. 138—143)

ABSTRACT OF THE DISCLOSURE

A laminate comprising a polyolefin base bonded to a thin gas-impermeable layer of plastic film or metal foil is made by fusing to the surface of the base a layer of a copolymer of ethylene and an ethylenically unsaturated aliphatic acid, then bonding the copolymer layer to the gas-impermeable layer with an epoxy adhesive. Tubular-shaped fluid conduits of such laminates are disclosed.

---

This invention relates to gas-impermeable laminates formed of polyolefins and having outstanding properties with respect to delamination resistance. In a preferred embodiment the invention also relates to tubular-shaped fluid conduits comprising such laminates.

In accordance with the invention there is formed a novel laminated structure comprising a polyolefin base bonded to a thin gas-impermeable layer of plastic film or metal foil. The bonding between these layers is achieved by means of an epoxy adhesive in conjunction with an intermediate layer of a particular ethylene/acid copolymer. Thus there is fused to a first surface of the polyolefin base a layer of an ethylene/acid copolymer with a major proportion by weight of polymerized units of ethylene and 1 to 8% by weight of polymerized units of an alpha, beta-unsaturated aliphatic acid of 3 to 8 carbon atoms per molecule, the copolymer having a melt index of 0.01 to 30 grams/10 minutes and the layer thereof being at least 25 microns thick. The layer of ethylene/acid copolymer is in turn bonded to the gas-impermeable layer by the epoxy adhesive.

A wide variety of materials may be used as the thin gas-impermeable layer although, preferably, the material so employed will be at least 10 microns thick and will have a methane permeability less than $1\times 10^{-10}$ cm.$^3$/sec./cm. of thickness/cm. of Hg pressure/cm.$^2$. Suitable gas-impermeable layers include a variety of commercially available films and foils.

In one embodiment of the invention, the gas-impermeable laminate is in the form of a fluid conduit, e.g. a pipe or other tubular-shaped structure. It has been found that the combination of an ethylene/acid copolymer layer, as above described, with an epoxy adhesive enables the provision of conduits capable of withstanding severe operating conditions for conveying gases under pressure, especially natural or other hydrocarbon gases, with little or no losses by leakage. In particular, these conduits are highly coherent, i.e. resistant to separation or delamination, even when subjected to fluctuating gas pressures or to external mechanical forces. It will be apparent that similar advantages accrue also to laminated products of the invention when in the shape of structures other than tubes, e.g. storage containers, gasketing material, sheet products for lining cartons and the like, and many other items.

The invention has particular applicability when the polyolefin base is formed of plexifilamentary material as described in U.S. Patent 3,081,519. The plexifilamentary material is composed of networks having a surface area greater than 2m.$^2$/g. and comprising a three-dimensional integral plexus of fibrous elements, e.g., of a crystalline polyolefin. The fibrous elements are characterized as being coextensively aligned with the network axis, having the structural configuration of oriented film-fibrils, and further as having an average film thickness of less than 4 microns and an average electron diffraction orientation angle of less than 90°. As a highly coherent base of the laminate, a layer or aggregate of the plexifilamentary material is formed and the fibrous elements thereof are heat-welded and compacted together at their cross-over points, but not to such an extent that their orientation will be destroyed at the center of thickness of the layer. The density of the layer will be on the order of 0.65 to 0.90 g./cm.$^3$.

The use of plexifilamentary material in the fabrication of tubular-shaped products is described in French Patent 1,353,231 of Woodell, corresponding to U.S. application Ser. No. 180,172, filed Mar. 16, 1962, now U.S. Patent No. 3,183,941, the disclosures of which are incorporated herein by reference. Those tubular shaped products are advantageously formed by wrapping, e.g. spirally, a coherent aggregate of plexifilamentary material on a mandrel and applying heat and pressure. They are characterized by outstanding properties with respect to hoop strength, the hoop strength at burst (ASTM method D-1599–58T for incremental pressure) being at least 7,000 p.s.i. (493 kg./cm.$^2$), and low weight as compared to prior art structures of similar dimensions.

The novel construction of the products of the invention will be further evident from a consideration of FIGURES 1 and 2. In each case these drawings represent cross-sectional views of tubular-shaped conduits of the invention. As illustrated the polyolefin base layer is formed of plexifilamentary material, as above described. The thickness of the lining layers has been exaggerated to facilitate ease of illustration and understanding. Although the innermost layers of epoxy adhesive and ethylene/acid copolymer in FIGURE 2 are not essential features, they do help to eliminate damage during shipment and installation.

The invention will now be described with reference to the individual components or lamina and then to suitable fabrication procedures.

POLYOLEFIN BASE

The polyolefin base, e.g. as a sheet or tubular body is the major strength-imparting portion of the products. It is comprised of a high molecular weight, film-forming polymer such as polypropylene, branched polyethylene, linear polyethylene, blends of the foregoing, polyethylene copolymers such as those from ethylene/isobutylene, ethylene/octene and ethylene/decene. Copolymers of at least 90% by weight ethylene and up to 10% of an alpha-olefin with 3 to 12 carbon atoms per molecule are particularly useful for preparing structures exhibiting low growth under pressure.

In the case of the preferred polyolefin bases formed of plexifilamentary material, these are described in detail in French Patent 1,353,231 referred to above. Plexifilamentary strands are first formed by a flash-spinning process in which there is extruded a homogeneous solution of a fiber-forming polymer in a liquid which is a non-solvent for the polymer below its normal boiling point, at a temperature above the normal boiling point of the liquid, and at autogenous pressures or greater into a medium of lower temperature and substantially lower pressure. The vaporizing liquid within the extrudate forms bubbles, cools the extrudate as the bubbles expand, causing solid polymer to form, and finally breaks through the confining walls of the bubbles to form networks of polymeric fibrils.

The flash spun products are characterized morphologically by their three-dimensional network of film-fibril elements. These networks may exist in various forms, but in all cases the film-elements are extremely thin. On the average the thickness of the film elements is less than 4 microns. In the preferred products the film elements are less than 2 microns thick. The plexifilaments have an internal fine structure or morphology which may be characterized as a three-dimensional integral plexus consisting of a multitude of essentially longitudinally extended interconnecting random length fibrous elements (so-called "film-fibrils") which have the form of thin ribbons of a thickness less than 4 microns. The film-fibrils, often found as aggregates, intermittently unite and separate at irregular intervals called "tie points" in various places throughout the width, length and thickness of the strand to form an integral three-dimensional plexus. The film-fibrils are often rolled or folded about the principal film-fibril axis, giving the appearance of a fibrous material when examined without magnification. Plexifilamentary strands are unitary or integral in nature, meaning the strands are one piece of polymer, are continuous in nature, and the elements which constitute the strand are cohesively interconnected.

The plexifilamentary strands have a surface area greater than 2 m.$^2$/g., as measured by nitrogen adsorption methods. Due to the extremely high polymer/air interfacial area the strands have marked light scattering ability and high covering power.

For purposes of this invention the plexifilamentary materials are preferably used as aggregates in sheet form. For example sheets may be made by direct lay-down of plexifilamentary strands on a moving belt after causing them to be spread by impingement on a baffle. This procedure is described in U.S. application Ser. No. 97,496, filed Mar. 22, 1961, now U. S. Patent No. 3,169,899. Alternatively, sheets may be made by cutting and beating plexifilamentary strands in aqueous suspension and by then forming sheets on a screen as in the normal paper-making operation.

The plexifilamentary materials may be made from a variety of thermoplastic and heat-weldable polyolefin materials, but preferably of crystalline polyolefins. Typically suitable polyolefins have been described above. With the crystalline polyolefins, polymer crystallites in the film-like elements are planar oriented. This orientation can be detected by electron diffraction techniques using standard X-ray diffraction theory. Electron diffraction is used instead of X-ray diffraction in studying the film elements since the film elements are too thin to give dense X-ray diffraction spots. In the fibrillated plexifilamentary material, the crystallites have more orientation in the direction of the strand axis than in any other direction within the plane of the film element. The electron diffraction arc is less than 90° for the film-fibril elements.

It is to be understood that the invention is also applicable to polyolefin bases other than those formed of plexifilamentary material. Ordinary extruded or cast polyolefin films as well as other polyolefin articles can be used where secure bonding to another layer is desired. One form of material suitable as a polyolefin base is a compressed ultramicrocellular sheet product as described in Belgian Patent 625,829, issued June 7, 1963. The ultramicrocellular structures are produced by a flash-spinning process similar to that described above for the plexifilamentary materials except that less severe temperatures or higher polymer concentrations are employed.

ETHYLENE/ACID COPOLYMER

Copolymers of ethylene and an alpha, beta-unsaturated aliphatic acid useful in the present invention are fully described in Canadian Patent 655,298, issued Jan. 1, 1963.

The copolymer must exhibit adequate adhesive properties and for this reason must have a melt index of 0.01 to 30 grams/10 minutes. The layer of copolymer must also be of sufficient thickness in the laminate, usually at least 25 microns thickness and frequently up to 300 microns or more. Copolymers useful in the present invention must contain a major proportion, i.e. at least 70%, by weight of polymerized units of ethylene and 1 to 8% by weight of polymerized units of the unsaturated aliphatic acid. While copolymers with at least 70% ethylene are satisfactory for bonding, it is preferred to have more than 85% ethylene in the copolymer to keep the melting range suitably high. Typically suitable ethylenically-unsaturated aliphatic monomers are acrylic acid, methacrylic acid, crotonic acid, maleic acid, fumaric acid, itaconic acid and the methyl and ethyl hydrogen maleates and fumarates. A preferred material is a copolymer containing 95% by weight polymerized units of ethylene and 5% by weight of polymerized units of methacrylic acid.

It will be understood that the copolymer may contain other substituents besides ethylene and the $\alpha,\beta$-unsaturated aliphatic acid, provided that the ethylene and unsaturated acid constituents are present in the required proportion. For example the copolymer layer may be composed of 82% ethylene, 6% methacrylic acid, and 12% vinyl acetate. The methacrylic acid units need not be in the pure acid form. A very satisfactory product is made from partially neutralized polymer having by weight 90% ethylene, 7% methacrylic acid, and 3% sodium salt of methacrylic acid.

The copolymers as above described can be extruded in the form of film much in the manner of polyethylene. In this form they are particularly useful for combining with the polyolefin base, e.g. by heat-fusing superposed layers. Preferably the copolymer will have a somewhat lower melting point than the polyolefin base to which it will be fused.

The partially neutralized polymers can be applied to the polyolefin base in the form of an aqueous dispersion and then dried.

EPOXY ADHESIVE

In general any epoxy adhesive is useful in the practice of the invention if it is formed of a 1,2-epoxide resin and a polyfunctional curing agent or hardener. Generally the 1,2-polyepoxides which are useful in this invention are obtained by the reaction of phenolic compounds with epichlorohydrin in the presence of a base. The resulting resins may be either bifunctional, trifunctional or tetrafunctional. Representative phenols which may be reacted with epichlorohydrin to obtain 1,2-polyepoxides which are useful in this invention include bis-phenol A, tetrachlorobisphenol A, and diphenolic acid. Aliphatic diols and triols may also be used with epichlorohydrin. Intermediate degrees of polymerization may characterize the 1,2-polyepoxide, such as when the epoxide chains have multiple functional groups which may interact to produce longer functional chains. Other representative examples of 1,2-polyepoxides which may be used are described in "Epoxy Resins" by Henry Lee and Kris Neville, McGraw-Hill, 1957, New York. Preferably the 1,2-polyepoxide is a liquid and is used without dilution or filling with pigment. The epoxy formulation should preferably be one which will give a high impact type of resin to provide a structure which will not crack when subjected to heavy mechanical or hydraulic loads, epoxy resins with low viscosity, and which cure at room temperature are desirable for this reason. A satisfactory 1,2-polyepoxide resin is the diglycidyl ether of bisphenol A which is represented by the following structural formula:

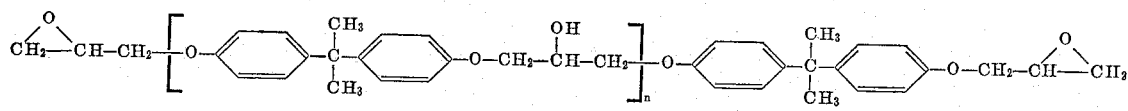

A wide variety of curing agents may be used in curing the 1,2-polyepoxides to yield the epoxy adhesives of this invention. The cure may be carried out in either a "one stage" or "two stage" cure. The preferred class of curing agents are polyfunctional amines. Representative of this class of curing agents are ethylenediamine, diethylenetriamine, triethylenetetramine, tetraethylenepentamine, dicyandiamide, piperidine, N-(hydroxyethyl) diethylenetriamine, primary and secondary aliphatic and aromatic amines, hydroxylamines. Dicarboxylic acids and anhydrides such as phthalic acid, pyromellitic anhydride, endophthalic acid and the like may also be used as well as mixtures of any thereof. The amount of curing agent which may be employed in the 1,2-polyepoxide resin will depend on the nature of the 1,2-polyepoxide epoxide and the curative. In particular cases "self curing" 1,2-polyepoxides may be used advantageously as adhesive, in which the curatives are "built into" the 1,2-polyepoxide. Small amounts of conventional fillers such as sand, silica, aluminum powder may be added to the 1,2-polyepoxide adhesives if desired. Preferably any filler so employed will not be permeable to methane gas.

The amount of the 1,2-polyepoxide film which is necessary to give adequate adhesion between the ethylene/acid copolymer and the gas-impermeable film or foil is not particularly critical. The minimum amount, which should be at least enough to create a continuous film so as to uniformly distribute stress, may in fact vary depending upon the nature of the gas-impermeable layer.

GAS-IMPERMEABLE LAYER

As described above, the gas-impermeable layer will preferably have a methane permeability less than $1 \times 10^{-10}$ cm.$^3$/sec./cm. of thickness/cm. of Hg pressure/cm.$^2$. Ordinarily the layer should be at least 10 microns thick. Especially suitable gas-impermeable layers are selected from the group consisting of (a) a silicon monoxide-coated film of a polyester of a glycol and terephthalic acid,
(b) aluminum foil,
(c) a film of an oriented acrylonitrile polymer,
(d) a flame treated film of a vinyl fluoride polymer,
(e) a film of polyesterurethane,
(f) biaxially oriented polypropylene film,
(g) a layer of at least partially hydrolyzed polyvinyl acetate, and
(h) a nylon film.

Typically suitable polyesterurethanes are disclosed in U.S. Patents 3,015,650 and 2,899,411. The silicon monoxide coatings upon the polyester film are for purposes of rendering the film sealable to the epoxy adhesive. U.S. Patent 3,141,912 describes suitable biaxially oriented polypropylene films.

Each of the foregoing, in contrast to certain other known gas-impermeable materials, is capable of giving a high strength bond with an epoxy adhesive. One or more of these materials are especially required if the fluid conduit or other laminate is to be used for applications in which it would be exposed to widely varying pressures or to other severe mechanical forces. In the case where fluid conduits are to be produced by a spiral winding procedure, the seal at the lap-over points for the gas impermeable liner must itself be gas proof. With thermoplastic liners this is achieved by applying heat sufficient to fuse the gas-impermeable material to itself at the lapped edges. For other materials such as aluminum foil it may be necessary to apply epoxy resin at the lapped edges. In general, however, the epoxy adhesive which will be used to seal the gas impermeable layer to the ethylene/acid copolymer layer will be sufficient for purposes of providing a gas-tight seam at the lapped edges. With certain materials it is possible to avoid this problem by extrusion of the gas-impermeable layer in tubular form. It should be noted that for certain thermoplastic gas-impermeable materials which do not have adequate heat sealing properties, it is desirable to appropriately modify both surfaces of the sheet. For example, a polyvinyl fluoride film which does not ordinarily seal properly at the lapped edge can be flame treated on both sides and then coated with an epoxy adhesive to provide a satisfactory lapped edge.

LAMINATE-FORMING PROCEDURE

In the practice of this invention laminates are formed by assembling the plural layers followed by appropriate bonding, usually with the application of heat and pressure. This process will be described in detail in the following with particular reference to the preferred embodiment wherein fluid conduits are formed of the so-called plexifilamentary or film-fibril material.

For the preparation of fluid conduits, a tubular-shaped article is preferably formed by wrapping successive layers of the various sheet materials or strands onto a suitable mandrel. The epoxy adhesive, however, will be applied as an intermediate layer in the form of a coating. The various sheets to be bonded together may be wide or they may be in the form of a narrow tape. In the case of narrow tapes it is desirable to wind the tube in helical fashion. The basic strength-imparting polyolefin base layer, e.g., a film-fibril sheet, is usually applied after the various lining materials have been wound on the mandrel. A film-fibril sheet employed for this purpose should have a weight in the range 1 to 20 oz./yd.$^2$, a thickness of 10 to 200 mil, and a density between 0.15 and 0.6 g./cc. The wrapping or winding of the sheet into a tubular structure should be done under sufficient tension to give a compact material. Commercial equipment for forming tubular structures from sheets is readily available and many varieties exist. The innermost layer about which others are to be wound may be an extruded liner.

After formation of the tubular structure by wrapping the various layers of sheet material with an intermediate application of epoxy adhesive, the unbonded tubular structure is subjected to internal and external pressure. While under pressure, heat is applied to the tubular structure and the temperature carefully adjusted to effect thermal bonding without fully destroying either the identity or orientation of the fine film-fibril elements composing the base layer of the tubular structure. This heat-bonding or welding is carried out at temperatures near the polymer melting temperature of the film-fibril material. The temperature at the center of thickness of the conduit wall should not exceed the polymer melting temperature of the film-fibrils lest complete de-orientation ensue and the advantageous strength properties which they provide be diminished.

It will be understood, however, that the temperature employed for the above-described heat-bonding must be high enough to (1) soften the outer film-fibril elements, and (2) effect a bonding or welding together of the inner film-fibril elements at their points of contact without destroying the fine films or their orientation and (3) to fuse the ethylene/acid copolymer bonding layer to the film-fibril material. In general the surface temperature of the conduit wall will be between 25° C. under the melting point and 10° C. over the melting point. The temperature used for the heat-bonding step will vary depending upon the type of polymer which comprises the fine film-fibrils. The time of exposure of the tubular structure to the heat-bonding temperature is a function of the rate of heat transfer, the thickness of the conduit walls and the method of heating, as well as the type of polymer. In a process operating within the temperature limits as above mentioned, the tubular material is advantageously heated between 0.1 and 30 minutes. It is preferred however, to operate with wall temperatures between 2° C. under the polymer melting point and 10° above the polymer melting point and with exposure times of less than five minutes.

The pressure employed during the heat-bonding depends on the type of polymer comprising the film-fibril elements and upon the degree of compaction or the density desired in the tubular structure. Pressures in the range of 20 to 100 p.s.i.g. have been found most suitable for preparing tubular structures from plexifilaments of linear polyethylene.

The tension applied to the sheet during wrapping or winding of the tubular structure and the pressure applied during heat-bonding, introduce stresses which help to maintain, frequently even increase, the orientation of the film-fibril elements in the conduit walls so as to develop maximum strength properties.

Devices for applying pressure simultaneously to the inside and outside of a tubular or hollow structure are well known in the art. Among such commercial devices are those having a rigid shell with an inflatable or otherwise expandable mandrel, or a rigid mandrel with external pressure rollers to give the external pressure. Heat may be supplied in many ways such as by steam, or by electrical heaters. Suitable commercial equipment also exists which can be utilized for a continuous process in which the wrapping and heat-bonding steps are integrated, permitting the production of continuous lengths of pipe.

After the heat-bonding step the tubular-shaped structure is cooled to a temperature well below the heat-bonding temperature before the internal and external pressures are reduced. When cool, the pressure is reduced and the tube is removed from the mandrel. If the pressure is reduced before the tube or pipe is sufficiently cool, shrinkage or distortion may occur.

Tubular products can be made in accordance with the invention to have diameters from ¼ inch to 4 feet, but are preferably 2 to 18 inches in diameter. The wall thickness can be 10 mils to 1 inch, but is preferably between 30 mils and 200 mils. The compacted heat-welded film-fibril layer alone will have a density of 0.65 to 0.90 g./cc.

Despite the low weight per unit length the tubular-shaped fluid conduits of the invention have hoop strengths above 7,000 p.s.i., and in the preferred forms have hoop strengths of 13,000 p.s.i. to 40,000 p.s.i. when tested in accordance with ASTM–1599. As herein used, hoop stress relates to the actual stress in the pipe wall and is measured by Barlow's approximate formula: $HS=PD/2t$ where $P$=fluid pressure at burst, lbs./in.$^2$ (gauge), $D$=outside diameter, inches, $t$=wall thickness, inches.

The outside of the conduit may be coated in a variety of ways for specific uses. For example, the outside coating may contain an ultra-violet screener, carbon black, pigments, or other fillers. The lined conduit in addition to handling gases without appreciable loss is completely leak-proof with liquids. For example, water can be handled at pressures of 200 p.s.i. and higher depending on wall thickness.

A conduit of particularly high strength may be prepared of film-fibril sheet materials by stretching the circumference 10 to 50% during the process of manufacture. Still higher strength properties may be obtained by stretching the film-fibril sheet product 10 to 100% in the lengthwise direction before winding about the mandrel.

In conduits made from plexifilamentary sheets the maximum hoop strength is obtained when more than 60% of the film-fibril elements in the finished pipe are oriented within 45° of the circumferential direction.

While a wide variety of oriented polyolefin materials may be used in the film elements of this invention, linear polyethylene is preferred.

As employed herein, the melt index of the polymer is determined by the ASTM Method D–1238–57T, Condition E. The melt index is a measure of flowability for the molten polymer (grams per ten minutes) and is inversely related to molecular weight. The term "linear polyethylene" herein refers to polyethylene having densities of 0.94 to 0.98 g./cc., but preferably having densities of 0.95 or higher.

The plexifilamentary material in the examples which follow was spun from a solution of 13% linear polyethylene (density 0.953 g./cm.$^3$, melt index 0.5) and 87% trichlorofluoromethane ("Freon" 11) according to U.S. Patent 3,081,519. The solution was provided continuously at a temperature of 185° C. and a pressure of 900 p.s.i.g. and spun through an orifice. The plexifilamentary strand was extruded continuously in the form of a three-dimensional network of film-fibril materials. The strand impinged against a baffle immediately upon formation and was thereby spread into a wide web. The web was collected on a moving belt in overlapping multidirectional layers. The belt was run at a speed sufficient to give a sheet having a weight of 3.5 oz./yd.$^2$. This collected sheet was then passed through a pair of cold rolls to apply a pressure of 10 lbs./linear inch of roll axis thereto. The resulting film-fibril sheet was used to make a variety of pipe constructions including the multi-layer products of the invention as well as others for comparison.

The pipe forming process of the examples may be summarized as involving five separate steps including:

(1) Slitting the film-fibril sheet stock, and other sheet components if used, to make tape. To make 4 inch diameter pipe a tape 4 inches wide will be used. Eight inch wide tape is used to make 8 inch diameter pipe.

(2) Spiral winding tapes of the various components on a mandrel to make an unbonded pipe. Epoxy adhesive would be applied as an intermediate layer from a coating composition.

(3) Heat-treating the unbonded pipe under pressure in a mold to form a bonded pipe.

(4) Trimming the ends to shape the pipe.

(5) Heat-sealing the ends to prevent leakage. Details of these process steps are as follows:

The first step consisted of slitting the various wide sheet stocks to make tapes which were wound up in rolls. Next the unbonded pipe was prepared by winding ends of the tape about a collapsible mandrel on a winder. The tape is wound spirally as the mandrel turns, one or more ends of the tape being carried on a traversing creel. The winder is designed to spirally wrap several ends of tape around a mandrel 13-feet long in a single direction. The 13-foot length was chosen to allow for end trimming and end sealing to give a finished 10-foot pipe length. For making 4 inch diameter pipe the mandrel is adjusted to have an expanded outside diameter of 3.0 inches. In operation the collapsible mandrel is rotated between 2 centers as in a lathe and the traversing creel is driven by a lead screw similar to the compound rest which traverses the cutting tool on a metal lathe. The machine is geared so that the traverse to wind ratio can be adjusted to give a definite pattern by changing sprockets. For the basic strength-imparting layers of the pipe multiple rolls of 3.5 oz./yd.$^2$ film-fibril sheet, in tape form 4 inches wide are mounted on the traversing creel. The ends of the tape are fastened with pressure sensitive adhesive tape and spirally wrapped around the mandrel as it rotates and as the creel advances along its length. The tapes are then cut at the lower end and fastened with adhesive tape to the mandrel. The lead screw is then reversed and the creel returned to its starting position and the winding operation repeated until the desired number of wraps and weight have been built up on the mandrel. The mandrel containing the preform is then removed from the winder. The mandrel is finally collapsed and the unbonded pipe is slipped off and is then ready for heat bonding.

The ethylene/acid copolymer film and the gas-impermeable foil or film are applied to the mandrel in the same manner, being cut first into 4 in. wide tape. It is of course possible to wind all of the materials in a straight convolute wind using full width film, i.e. 10-foot width. Depending on the final desired structure, the film tapes are wound either before or after the film-fibril sheet tapes are wound. Epoxy adhesive was not applied in sheet form although this would be possible if special cast sheets were prepared. Instead the 1,2-polyepoxide resin was applied in liquid form with a brush. It was simply coated over the previous layer by applying as uniform a thickness as possible. The curing agent and 1,2-polyepoxide resin were mixed together at room temperature and application started immediately (within 10 minutes) to avoid setting of the resin before application. Normal pot life of the mixed resin was about 45 minutes.

The tapes are arranged on the creel with the desired spacing to give a definite lap pattern of the tape in the pipe structure. Arrangement of the tapes for producing the pipes described in the following examples were as follows:

Spacing between wraps, 1.6 in.
Overlap of wraps, 0.8 in.
Wind angle, 72° from axis
Creel traverse/1 revolution of mandrel, 3.2 in.

Some of the materials used for the first wrap about the mandrel tended to stick to the rubber diaphragm in the molding apparatus, details of which are described in subsequent paragraphs. To avoid this a first film layer of "Teflon" polytetrafluoroethylene or "Tedlar" polyvinyl fluoride was wrapped around the mandrel to prevent sticking by subsequent layers.

In the winding operation for the basic film-fibril layers, 4 rolls of tape are wound simultaneously on the mandrel. Since much less material is needed for the other layers of structure it may be desirable to use only a single supply roll of these. In any case the ethylene/acid copolymer film layer and the gas-impermeable film layer should after bonding be continuous throughout the length of the pipe and should not be interrupted by layers of other material if the product is to be gas-proof and delamination-proof.

After the preformed unbonded pipe was removed from the mandrel it was transferred to an apparatus for bonding. This apparatus is shown in FIGURE 4. The unbonded preformed pipe at this point was a soft tube having a wall thickness of about ½ inch, the inside diameter being about 3 inches. This material was expanded in the bonding operation to an outside diameter of about 4 inches.

The pipes were trimmed to 10-foot lengths. Finally the ends were sealed by heating to incipient melting over a hot iron taking care to avoid over-heating and deorientation of the molecular structure of the film-fibrils.

The unbonded pipe 4 was placed in a steam-jacketed cylinder 2 as shown in FIGURE 3. A long expandable rubber tube 3 was then inserted in the pipe 4 so that the two were concentrically positioned. The expandable rubber tube was made air tight by fastening it between flanges 5 of the jacketed pipe, which was in turn connected to a steam line 6 and also to an air line 7. Air pressure (35 p.s.i.g.) was next applied to the rubber tube through the air supply pipe 7 causing the rubber tube to expand so that the unbonded pipe was pressed against the side walls of the cylinder 8. Vacuum was next applied to the space outside the pipe by way of vacuum line 9 to remove air entrapped in this annular space and in the interstices between the film-fibrils of the unbonded pipe. After evacuation of the air space around the pipe, the air pressure within the expandable tube was released through the air supply pipe 7. Steam was then supplied to the jacketed cylinder through inlet 12 and to the inside of the expandable rubber tubing diaphragm through inlet 6. The steam pressure was controlled to give a pressure on the unbonded pipe of 32 to 33 p.s.i.g. and a temperature of 135°–137° C. The condensate was passed through traps in outlet lines 10 and 11. Under these conditions of pressure and temperature, the film-fibrils in the pipe were heat-welded together at their cross-over points without destruction of the film-fibrils and without fully removing their orientation. Heat and pressure were applied for 20 minutes, then the steam supply was turned off, 35 p.s.i.g. air was applied to the inside of the rubber tube, and cold water introduced through line 12 into the jacket of the cylinder. Cooling was carried out under pressure to prevent the hot pipe from shrinking. After the mold became cool, air pressure was released and the finished pipe was removed from the mold. During the heat-bonding step a consolidation of the film-fibrils occurred and the outside layers stretched transversely 10.7% while the inner layers were stretched 26.1% transversely. The wall thickness of the pipe was reduced from about 0.44 inch to about 0.065 inch, the final outside diameter being about 3.97 inches.

A number of pipe constructions were made using the techniques described above. A summary of the test data and the construction of these pipes is given in Table 1. Examples I, II, III and IV demonstrate pipes without the improvements exhibited by the present invention. Examples V, VI, VII, VIII and IX demonstrate the improved pipes of the invention.

*Example I*

A pipe construction, not having gas-proof qualities, was made of flash-spun polyethylene plexifilamentary material combined with a layer of branched polyethylene as an inner-liner as disclosed in aforementioned French Patent 1,353,231. One layer of the branched polyethylene film (.006 inch thick) was used for the first wrapping of the mandrel. The minimum thickness of the layer after spiral winding was 0.006 inch and the maximum thickness was 0.012 inch. Leakage of this and other pipes used in the examples was tested as follows:

A section of pipe 16 inches long was closed at the ends by means of aluminum inserts containing neoprene O-rings. These plugs were clamped with radiator-type band clamps and were equipped with a pressure gauge, valve and pipe nipple for purposes of connection to a methane gas cylinder. The two ends of the assembly were sealed with epoxy adhesive. A suitable formulation comprised a liquid epoxy resin prepared from bisphenol A and epichlorohydrin, the resin having the general formula given above and having an epoxy equivalent weight of 185–195 (ASTM D–1652), a viscosity of 11,000 to 13,000 cps. at 25° C. (ASTM D–1824), a specific gravity at 25° C. of 1.15–1.17 (ASTM D–1475), and containing no inorganic filler. To 100 parts of the liquid resin was added with stirring 29 parts by weight of an amine hardener having an amine value of 8.5–9.5 meq./g., a specific gravity of 1.00–1.02 at 25° (ASTM D–1417) and a viscosity of 14–25 cps. at 25° C. (ASTM D–1824). The hardener has approximately the general formula

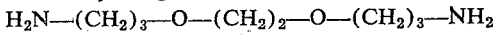

$$H_2N-(CH_2)_3-O-(CH_2)_2-O-(CH_2)_3-NH_2$$

The hardest and epoxy resin were mixed just prior to use. The end of the pipe was immersed in the adhesive in a mold during the hardening operation. The casting was allowed to cure overnight at room temperature.

The pipe sample was mounted in a test rack in a water bath at 73° F. The pipe section was then pressurized with methane gas at 62 p.s.i. and allowed to stand for a period of 24 hours. If leaks were observed in this period which were due to the end cap fittings the sample was discarded. If no leaks were observed the sample was left in the water bath and the pressure drop was measured over a long period of time. The loss in volume for the specimen in the test was calculated from the pressure drop and expressed in terms of cubic feet of gas at atmospheric pressure and 73° F./year/ foot of 4 in. diameter pipe as shown by Table 1. The branched polyethylene line pipe lost methane at the rate of 0.85 ft.³/yr./ft. This is excessive and is unsatisfactory from an economic and safety point of view in gas transmission lines.

*Example II*

This sample duplicated the product of Example I except that the branched polyethylene lining on the inside was replaced with a layer of spirally wrapped ethylene/methacrylic acid copolymer (95/5 by weight percent of respective units in the polymer). The ethylene/acid copolymer film used for this example was .020 in. thick. At any point in the pipe structure there were 2 layers of the film. This pipe was unsatisfactory in that the leakage was 0.82 ft.³/yr./ft.

*Example III*

Another pipe similar to that of Example II was made using ethylene/methacrylic acid 95/5 copolymer in the form of film .010 in. thick. The leakage was double that of Example II (see Table 1).

*Example IV*

This example shows the inadequacy of epoxy adhesive itself in preventing leakage of natural gas through the pipe wall. As shown in the Table 1 the product is not as good as the sample lined with branched polyethylene.

*Examples VI to X*

These pipes would be satisfactory for use in natural gas transmission lines. The materials are substantially impervious to the methane gas. None of them allows diffusion of more than 0.3 ft.³/year/linear foot of 4 inch diameter pipe. The identity of the various codes in Table 1 is shown at the bottom of the table. It should be noted that many of the liners are derived from specially-treated film. For example, the coated polyethylene terephthalate film permitted no measurable leakage in the test. This film was coated with silicon monoxide. Much less favorable results were obtained with uncoated polyethylene terephthalate. In the case of the polypropylene gas barrier, the liner was composed of biaxially oriented film rather than unoriented film.

In Example V the laminated structure was similar in arrangement to the pipe of FIGURE 1. The products of Examples VI to IX had two additional inner layers as shown in FIGURE 2. The two additional layers are epoxy adhesive and ethylene/methacrylic acid (95/5) copolymer film. These two layers are unnecessary for obtaining pipe with low gas permeability but they add increased resistance to puncturing of the gas impermeable layer during installation or transporting of the pipe. It will be apparent that a variety of other materials could be used in place of these layers.

All of the items in Examples V to IX resist delamination when mechanically crushed without puncturing or when subjected to surges in pressure. They are ideally suited for field operations in which the material might be subjected to damage by heavy pipe line moving and burial equipment or damaged by trucks.

Similar results to the above may be obtained for a pipe with a gas barrier of polyvinyl fluoride given a flame treatment in order to insure adequate adhesion at lap over points.

The fluid conduits produced above have good resistance to delamination and at the same time have unusually high hydrocarbon gas impermeability. The samples also exhibit high hoop strength and are extremely light in weight, making them unusually good candidates for gas conduits.

It will be understood that the conduits may take the form of couplings, elbows, valves and other pipe fittings and a variety of other structures.

TABLE I.—METHANE GAS LEAKAGE TESTS—4-IN. DIAMETER PIPE AT 73° F.

| Example Number | Composition and Order of Layers (From inside to outside) | Weight of Layers, lb./ft. | Total Thickness of Membrane Material, Mils | Test Duration, Hours | Gas Loss, ft.³/yr./ linear ft. |
|---|---|---|---|---|---|
| I | BPE/FSLPE | .025/.194 | 6 | 280 | 0.85 |
| II | EMAA/FSLPE | .066/.190 | 20 | 280 | 0.82 |
| III | EMAA/FSLPE | .032/.176 | 10 | 200 | 1.62 |
| IV | EMAA/EPOXY/EMAA/FSLPE | .033/.005/.032/.191 | (1-2) | 252 | 1.52 |
| V | UR/EPOXY/EMAA/FSLPE | .046/.012/.033/.171 | 10 | 257 | 0.23 |
| VI | EMAA/EPOXY/PS/EPOXY/EMAA/FSLPE | .036/.022/.006/.021/.037/.176 | 1 | 497 | 0.00 |
| VII | EMMA/EPOXY/Al/EPOXY/EMAA/FSLPE | .037/.015/.025/.016/.037/.166 | 3 | 340 | 0.013 |
| VIII | EMAA/EPOXY/PVA/EPOXY/EMAA/FSLPE | .032/.016/.017/.017/.032/.165 | 3 | 1,000 | 0.00 |
| IX | EMAA/EPOXY/PP/EPOXY/EMAA/FSLPE | .034/.016/.011/.017/.035/.178 | 2.5 | 1,000 | 0.00 |
| X | EMAA/EPOXY/NYLON/EPOXY/EMAA/FSLPE/U.V. BARRIER BPE. | .0535/.0205/.065/.0205/.0535/.346/.032 | 5.5 | 8,136 | .0084 |

Table I Code.—BPE=Film of branched chain polyethylene; FSLPE=Flash-spun linear polyethylene sheet; EMAA=Film of ethylene/methacrylic acid copolymer (95/5); EPOXY=1,2 epoxide-amine hardener mixture described above (100/29 weight ratio); PS=Film of polyethylene terephthalate with .008 mil coating of vacuum-deposited silicon monoxide; AL=Aluminum foil; PVA= Film of polyvinyl alcohol, essentially full hydrolysis; PP=Film of biaxially oriented isotactic polypropylene as produced according to U.S. Patent 3,141,912; UR=Polyesterurethane from the reaction product of a diisocyanate, e.g. p-p'diphenyl diisocyanate or meta-phenylene diisocyanate, with a long chain polyester, e.g. that formed from butane diol and adipic acid or of neopentyl glycol and isophthalic acid.

What is claimed is:

1. In a laminate comprising a polyolefin base bonded to a thin gas-impermeable layer selected from the group consisting of plastic film and metal foil, the improvement for attaining a laminate of increased delamination resistance, wherein (1) said polyolefin base is fused to a layer of an ethylene/acid copolymer of a major proportion of polymerized units of ethylene and 1 to 8% by weight of polymerized units of an alpha, beta-unsaturated aliphatic acid of 3 to 8 carbon atoms per molecule, said copolymer having a melt index of 0.01 to 30 grams/10 minutes, said layer of copolymer being at least 25 microns thick, and (2) said layer of ethylene/acid copolymer is in turn bonded to said gas-impermeable layer by an epoxy adhesive.

2. Laminate according to claim 1 wherein said gas-impermeable layer is at least 10 microns thick and has a methane permeability less than $1 \times 10^{-10}$ cm.³/sec./cm. of thickness/cm. of Hg pressure/cm.².

3. Laminate according to claim 1 wherein said gas-impermeable layer is at least 10 microns thick, has a methane permeability less than $1 \times 10^{-10}$ cm.³/sec./cm. of thickness/cm. of Hg pressure/cm.², and is selected from the group consisting of
   (a) a silicon monoxide-coated film of a polyester of a glycol and terephthalic acid,
   (b) aluminum foil,
   (c) a film of an oriented acrylonitrile polymer,
   (d) a flame treated film of a vinyl fluoride polymer,
   (e) a film of a polyester-polyurethane,
   (f) biaxially oriented polypropylene film,
   (g) a layer of at least partially hydrolyzed polyvinyl acetate, and
   (h) a nylon film.

4. Laminate according to claim 1 wherein said polyolefin base comprises linear polyethylene.

5. Laminate according to claim 1 wherein said polyolefin base comprises a coherent layer of plexifilamentary material composed of networks having a surface area greater than 2 m.²/g. and comprising a three-dimensional integral plexus of crystalline polyolefin fibrous elements, said elements being coextensively aligned with the network axis and having the structural configuration of oriented film-fibrils, an average film thickness of less than 4 microns and an average electron diffraction orientation angle of less than 90°; within said coherent layer the fibrous elements being heat-welded and compacted together at their cross-over points but retaining their said orientation at the center of thickness of said coherent layer, the density of said coherent layer being 0.65 to 0.90 g./cm.$^3$.

6. Laminate according to claim 5 wherein said crystalline polyolefin fibrous elements are comprised of linear polyethylene.

7. A fluid conduit having walls comprised of an integral assembly of layers and including (a) a tubular body of a polyolefin, (b) fusion bonded to the inner surface of said polyolefin tubular body a layer of an ethylene/acid copolymer with a major proportion by weight of polymerized units of ethylene and 1 to 8% by weight of polymerized units of an alpha, beta-unsaturated aliphatic acid of 3 to 8 carbon atoms per molecule, said copolymer having a melt index of 0.01 to 30 grams/10 minutes, said layer of copolymer being at least 25 microns thick, and (c) a layer of an epoxy adhesive uniting said layer of ethylene/acid copolymer to (d) a thin gas-impermeable layer selected from the group consisting of plastic film and metal foil.

8. Fluid conduit according to claim 7 wherein said gas-impermeable layer is at least 10 microns thick and has a methane permeability less than $1 \times 10^{-10}$ cm.$^3$/sec./cm. of thickness/cm. of Hg pressure/cm.$^2$.

9. Fluid conduit according to claim 7 wherein said gas-impermeable layer is at least 10 microns thick, has a methane permeability less than $1 \times 10^{-10}$ cm.$^3$/sec./cm. of thickness/cm. of Hg pressure/cm.$^2$, and is selected from the group consisting of
  (a) a silicon monoxide-coated film of a polyester of a glycol and terephthalic acid,
  (b) aluminum foil,
  (c) a film of an oriented acrylonitrile polymer,
  (d) a flame treated film of a vinyl fluoride polymer,
  (e) a film of a polyester-polyurethane,
  (f) biaxially oriented polypropylene film,
  (g) a layer of at least partially hydrolyzed polyvinyl acetate, and
  (h) a nylon film.

10. Fluid conduit according to claim 7 wherein said tubular body of a polyolefin comprises linear polyethylene.

11. Fluid conduit according to claim 7 wherein said polyolefin tubular body comprises a wound coherent aggregate of plexifilamentary material composed of networks having a surface area greater than 2 m.$^2$/g. and comprising a three-dimensional integral plexus of crystalline polyolefin fibrous elements, said elements being coextensively aligned with the network axis and having the structural configuration of oriented film-fibrils, an average film thickness of less than 4 microns and an average electron diffraction orientation angle of less than 90°; within said coherent aggregate the fibrous elements being heat-welded and compacted together at their cross-over points but retaining their said orientation at the center of thickness of said coherent aggregate, the density of said coherent aggregate being 0.65 to 0.90 g./cm.$^3$.

12. Fluid conduit according to claim 11 wherein said crystalline polyolefin fibrous elements are comprised of linear polyethylene.

13. Fluid conduit according to claim 11 having a hoop stress at burst of at least 7,000 p.s.i.

14. Fluid conduit according to claim 11 wherein said alpha, beta-unsaturated acid is methacrylic acid.

References Cited

UNITED STATES PATENTS

| | | | |
|---|---|---|---|
| 3,032,460 | 5/1962 | Chipman et al. | 161—186 X |
| 3,085,922 | 4/1963 | Koller | 161—170 X |
| 3,228,823 | 1/1966 | Usala et al. | 161—189 X |

EARL M. BERGERT, *Primary Examiner.*

HAROLD ANSHER, *Examiner.*